US012765513B2

(12) United States Patent
Wild et al.

(10) Patent No.: US 12,765,513 B2
(45) Date of Patent: Oct. 20, 2026

(54) ANIMAL EAR TAG AND METHOD FOR PRODUCING SUCH AN ANIMAL EAR TAG AND USE OF AN ANTIMICROBIAL ADDITIVE FOR PRODUCING AN ANIMAL EAR TAG AND USE OF AN ANIMAL EAR TAG WITH AN ANTIMICROBIAL ADDITIVE

(71) Applicant: GEPE Geimuplast GmbH, Farchant (DE)

(72) Inventors: Andreas Wild, Bad Tölz (DE); Markus Helmut Durmann, Murnau am Staffelsee (DE); Adrian Paul Koch, Ilmenau (DE); Johann Schöpf, Garmisch-Partenkirchen (DE)

(73) Assignee: GEPE GEIMUPLAST GMBH, Farchant (DE)

(*) Notice: Subject to any disclaimer, the term of this patent is extended or adjusted under 35 U.S.C. 154(b) by 57 days.

(21) Appl. No.: 18/808,753

(22) Filed: Aug. 19, 2024

(65) Prior Publication Data

US 2025/0287915 A1 Sep. 18, 2025

(30) Foreign Application Priority Data

Mar. 13, 2024 (DE) ..................... 10 2024 107 216.4

(51) Int. Cl.

*A01K 11/00* (2006.01)
*C08K 3/015* (2018.01)
*C08K 3/40* (2006.01)

(52) U.S. Cl.

CPC ............ *A01K 11/001* (2013.01); *C08K 3/015* (2018.01); *C08K 3/40* (2013.01); *A01K 2227/101* (2013.01); *A01K 2227/102* (2013.01); *A01K 2227/108* (2013.01); *C08K 2201/005* (2013.01)

(58) Field of Classification Search

CPC .............................. A01K 11/00; A01K 11/001
See application file for complete search history.

(56) References Cited

U.S. PATENT DOCUMENTS

| | | | |
|---|---|---|---|
| 5,308,351 | A | 5/1994 | Nehls |
| 6,021,592 | A | 2/2000 | Caisley |
| 7,235,055 | B2 | 6/2007 | Pfistershammer |
| 7,772,979 | B2 | 8/2010 | Caisley |
| 8,668,655 | B2 | 3/2014 | Destoumieux et al. |
| 8,858,568 | B2 | 10/2014 | Nehls et al. |
| 9,301,497 | B2 | 4/2016 | Hilpert et al. |
| 9,554,557 | B2 | 1/2017 | Nehls |
| 10,757,913 | B2 | 9/2020 | Decaluwe et al. |

(Continued)

FOREIGN PATENT DOCUMENTS

| | | | | |
|---|---|---|---|---|
| AT | 518996 B1 | | 3/2018 | |
| CN | 106957522 A | * | 7/2017 | .............. C08L 75/04 |

(Continued)

OTHER PUBLICATIONS

Estane® Eco 12T95 from The Lubrizol Corporation, issued Jul. 2021.

(Continued)

*Primary Examiner* — Cassandra Davis
(74) *Attorney, Agent, or Firm* — Nixon & Vanderhye P.C.

(57) ABSTRACT

An animal ear tag for marking livestock, in particular cattle, pigs, goats and sheep. The animal ear tag comprises a plastic, wherein an antimicrobial additive is incorporated into the plastic.

21 Claims, 5 Drawing Sheets

(56) References Cited

U.S. PATENT DOCUMENTS

| | | | |
|---|---|---|---|
| 2008/0044313 A1 | 2/2008 | Caisley | |
| 2016/0192621 A1 | 7/2016 | Berner | |
| 2019/0029656 A1 | 1/2019 | Gardner et al. | |
| 2019/0281791 A1 | 9/2019 | Berner | |
| 2019/0357496 A1 | 11/2019 | Auer | |

FOREIGN PATENT DOCUMENTS

| | | | | | |
|---|---|---|---|---|---|
| CN | 208581682 | U * | 3/2019 | | |
| CN | 218789786 | U * | 4/2023 | | |
| DE | 9214541 | U1 | 12/1992 | | |
| DE | 29702906 | U1 | 4/1997 | | |
| DE | 19707752 | A1 | 9/1997 | | |
| EP | 0031227 | A1 | 7/1981 | | |
| EP | 0092408 | A2 | 10/1983 | | |
| EP | 0513525 | A1 | 11/1992 | | |
| EP | 0535665 | A2 | 4/1993 | | |
| EP | 1219169 | A1 | 7/2002 | | |
| EP | 1014861 | B1 | 3/2004 | | |
| EP | 1419119 | B1 | 5/2006 | | |
| EP | 1923817 | A1 | 5/2008 | | |
| EP | 2016825 | A1 | 1/2009 | | |
| EP | 2384618 | A2 | 11/2011 | | |
| EP | 2153717 | B1 | 10/2012 | | |
| EP | 2705748 | A1 | 3/2014 | | |
| EP | 2770819 | B1 | 1/2016 | | |
| EP | 2050334 | B1 | 4/2017 | | |
| EP | 3004833 | B1 | 1/2019 | | |
| EP | 2579781 | B1 | 2/2019 | | |
| EP | 3684170 | A1 | 7/2020 | | |
| NL | 9400432 | A | 11/1995 | | |
| NL | 1027073 | C2 | 3/2006 | | |
| NL | 2005601 | C2 | 5/2012 | | |
| WO | 9525427 | A1 | 9/1995 | | |
| WO | 0239810 | A2 | 5/2002 | | |
| WO | WO-03018495 | A1 * | 3/2003 | .............. | A61P 31/04 |
| WO | 2005082132 | A2 | 9/2005 | | |
| WO | 2007013820 | A1 | 2/2007 | | |
| WO | WO-2009111850 | A1 * | 9/2009 | ........... | A01K 11/001 |
| WO | 2015051020 | A1 | 4/2015 | | |

OTHER PUBLICATIONS

Sanitized® BC A 21-41 from Sanitized AG, Oct. 20, 2023.
Communication dated Feb. 15, 2025 in DE counterpart application.

* cited by examiner

FIG. 5- Animal Tag

ANIMAL EAR TAG AND METHOD FOR PRODUCING SUCH AN ANIMAL EAR TAG AND USE OF AN ANTIMICROBIAL ADDITIVE FOR PRODUCING AN ANIMAL EAR TAG AND USE OF AN ANIMAL EAR TAG WITH AN ANTIMICROBIAL ADDITIVE

CROSS REFERENCE TO RELATED APPLICATIONS

This application claims priority to DE 10 2024 107 216.4 filed Mar. 13, 2024, the entire contents of which is hereby incorporated by reference.

FIELD

The invention relates to an animal ear tag for marking livestock such as cattle, pigs, goats and sheep and a corresponding method for producing such an animal ear tag. The invention further relates to a use of an antimicrobial additive comprising a silver component for producing an animal ear tag and a use of an animal ear tag comprising an antimicrobial additive, wherein the antimicrobial additive comprises a silver component.

BACKGROUND AND SUMMARY

Animal ear tags play a crucial role in modern agriculture, performing a plurality of functions essential to the efficient and safe management of livestock. These tags, which have individual numbers and/or codes, allow each livestock to be uniquely identified, which is key for monitoring health, implementing breeding programs and managing the herd. The ability to uniquely identify each livestock is also essential for full traceability in the event of disease outbreaks, which helps to contain disease and protect public health. In addition, animal ear tags help farms comply with legal requirements for livestock identification, which are often aimed at improving food safety and traceability. The accurate documentation and record keeping enabled by the use of animal ear tags is also important for the certification of meat quality and other special features. Ultimately, these tags contribute to more efficient farm management by providing valuable data for evaluating herd performance, leading to higher productivity and improved management practices.

The application of animal ear tags is an important part of modern livestock farming, but also involves specific risks, particularly with regard to the risk of infection. The perforation of the ears, which is necessary for attaching the animal ear tags, can be an entry point for bacteria and other pathogenic microorganisms. This risk is increased by the fact that livestock live in environments where they can easily come into contact with pathogens. If the animal ear tags are not applied under sterile conditions or if the aftercare of the wound is neglected, the risk of wound inflammation and/or infection increases, which not only affects the health and well-being of the affected livestock, but can also lead to the spread of disease within the herd. Furthermore, treating such infections can result in additional costs and labor for operators and in some cases even lead to permanent health damage or loss of the livestock.

It is therefore the object of example embodiments to provide an animal ear tag which reduces the risk of infection for the livestock when the animal ear tag is applied.

The object is solved by the animal ear tag and by the method for producing the animal ear tag according. Advantageous embodiments of the animal ear tag are also disclosed. The technology herein also provides a use of an antimicrobial additive comprising a silver component for the production of an animal ear tag, and a use of an animal ear tag comprising an antimicrobial additive, wherein the antimicrobial additive comprises a silver component.

The animal ear tag is used for marking livestock, in particular for cattle, pigs, goats and sheep. See FIG. 1. The animal ear tag comprises a plastic, wherein an antimicrobial additive is incorporated into the plastic.

It is particularly advantageous that an antimicrobial additive is incorporated into the plastic, as this inhibits or prevents the growth and spread of microorganisms such as bacteria, fungi and algae. Such an animal ear tag allows antimicrobial agents to be continuously present to protect the immediate area around the wound. This minimizes the risk of pathogenic microorganisms entering the wound and causing infections. The long-term effect of these additives ensures that protection is maintained over a longer period of time, which improves the chances of healing and promotes the livestock's general well-being. By tackling the risk of infection directly at source, antimicrobial additives, especially those using silver ions, help to protect livestock health, reduce the use of (further) antibiotics and ultimately contribute to safer and more efficient farming practices. It is particularly advantageous here that the antimicrobial additive is not only applied to the surface of the animal ear tag, for example by spraying the animal ear tag, but that the antimicrobial additive is introduced into the plastic and thus develops its effect over a longer period of time—even with superficial removal of the plastic.

The animal ear tag comprises the plastic. In principle, the animal ear tag can comprise exactly one plastic or several, in particular different, plastics. The antimicrobial additive can be incorporated in all, some or only one of the plastics.

In an advantageous embodiment, the animal ear tag comprises a first tag part and a second tag part configured to be attached to each other and to an ear of the livestock. Here, the first tag part and/or the second tag part comprises the plastic into which the antimicrobial additive is incorporated.

In an advantageous embodiment, the first tag part is made in one piece. Additionally or alternatively, the second tag part is made in one piece.

In an advantageous embodiment, the first tag part has a multi-part structure, wherein one, several or all parts of the multi-part first tag part comprise the plastic in which the antimicrobial additive is incorporated. Additionally or alternatively, the second tag part has a multi-part structure, wherein one, several or all parts of the multi-part second tag part comprise the plastic in which the antimicrobial additive is incorporated.

In an advantageous embodiment, the first tag part is formed by a single injection moulding process step. Additionally or alternatively, the second tag part is formed by a single injection moulding process step.

In an advantageous embodiment, the first tag part comprises a tag body and a pin, wherein the pin is arranged, i.e. fastened, with its first end to the tag body and wherein the pin comprises a tip and/or cutting edge at its second end. The second tag part comprises a tag body and a receiving element which is arranged, i.e. fastened, to the tag body. The pin, i.e. the tip and/or cutting edge, of the first tag part is configured to be pressed through an ear of the livestock and into the receiving element of the second tag part, forming a clamping and/or latching and/or form-fit connection. In this way, the animal ear tag can be attached to the livestock's ear very easily by joining the first and second tag parts together.

In an advantageous embodiment, the connection of the pin of the first tag part to the receiving element of the second tag part is not detachable in a non-destructively manner.

In an advantageous development, the pin of the first tag part comprises at least one or at least two barbs which engage in a corresponding counterpart in the receiving element of the second tag part and prevent the first tag part from being pulled off the second tag part.

In an advantageous embodiment, the pin and/or the receiving element is deformed after the connection has been made.

In an advantageous embodiment, the pin is arranged at an end region of the tag body of the first tag part, wherein the tag body widens starting from this first end region.

In an advantageous embodiment, the receiving element is arranged at an end region of the tag body of the second tag part, wherein the tag body widens starting from this end region.

In an advantageous embodiment, the shape of the first tag part is the same as the shape of the second tag part or is similar.

In an advantageous embodiment, the surface area of the first tag part is smaller than the surface area of the second tag part. Alternatively, the surface area of the first tag part is larger than the surface area of the second tag part. Alternatively, both surfaces are approximately the same size.

In an advantageous embodiment, the tag body of the first tag part is printed. In addition or alternatively, the tag body of the second tag part is printed. Preferably, laser printing is used.

In an advantageous embodiment, an RFID tag is integrated into the first tag part and/or the second tag part.

In an advantageous embodiment, the tag body and/or the pin of the first tag part comprise the plastic into which the antimicrobial additive is incorporated. Additionally or alternatively, the tag body and/or the receiving element of the second tag part comprise the plastic into which the antimicrobial additive is incorporated. In the event that the pin and/or the receiving element comprise the plastic into which the antimicrobial additive is incorporated, this allows the antimicrobial agents to become directly active in the area directly surrounding the wound. The use of the antimicrobial additive in the tag body also reduces the risk of microorganisms penetrating the wound and also ensures that the animal ear tag is more resistant to external influences, such as these microorganisms, and can remain in place on the livestock for longer. The structural integrity of the animal ear tag remains intact for longer.

In an advantageous embodiment, the first tag part is composed of more than 95% of the plastic into which the antimicrobial additive is incorporated. Additionally or alternatively, the second tag part is composed of more than 95% of the plastic into which the antimicrobial additive is incorporated. This means that the animal ear tag can be produced cost-effectively and is easy to handle. In general, plastic is a material that offers high durability and resistance to various environmental conditions. Plastic is resistant to water, extreme temperatures and UV radiation, which means that plastic ear tags retain their shape and readability in a wide range of climatic conditions. In addition, the flexibility of the plastic means that the ear tags are not easily damaged by physical stress, such as that caused by livestock moving around or rubbing against fences and vegetation. Another advantage is the variety of designs. Plastic ear tags can be produced in different colors and sizes, which facilitates additional visual identification of livestock and supports the organization of the herd according to various criteria such as age, sex or breeding status. The surface of plastic also allows for clear and permanent labeling with individual identification numbers, barcodes or even QR codes that are compatible with modern livestock management and traceability technologies.

In an advantageous embodiment, the tag body of the first tag part has a maximum height $h_1$ which is preferably greater than 4.5 cm, 5 cm, 5.5 cm or greater than 6 cm and which is preferably less than 6.5 cm or less than 6 cm. Preferably, the maximum height $h_1$ is 5.9 cm. The tag body of the first tag part has a maximum width $b_1$ which is preferably greater than 4.5 cm, 5 cm, 5.5 cm or greater than 6 cm and which is preferably less than 6.5 cm or less than 6 cm. Preferably, the maximum width $b_1$ is 5.6 cm. The pin of the first tag part has a length $l_1$ which is greater than 1.2 cm, 1.5 cm, 2 cm or which is greater than 2.5 cm and which is preferably less than 2.3 cm. Preferably, the length $l_1$ is 2.29 cm.

In an advantageous embodiment, the tag body of the second tag part has a maximum height $h_2$ which is preferably greater than 6 cm, 6.5 cm, 7 cm, 7.5 cm or greater than 8 cm and which is preferably less than 8.5 cm or less than 8 cm. Preferably, the maximum height $h_2$ is 7.8 cm. The tag body of the second tag part has a maximum width $b_2$ which is preferably greater than 4.5 cm, 5 cm, 5.5 cm or greater than 6 cm and which is preferably less than 6.5 cm or less than 6 cm. Preferably, the maximum width $b_2$ is 5.6 cm. The receiving element of the second tag part has a length $l_2$ which is greater than 0.5 cm, 0.8 cm, 1 cm or greater than 1.5 cm and which is preferably less than 2 cm or less than 1.5 cm. Preferably, the length $l_2$ is 1.12 cm.

In an advantageous embodiment, the tag body of the first and/or second tag part has a round cross-sectional shape or approximates a round cross-sectional shape. Preferably the diameter is more than 20 mm, 25 mm or more than 30 mm and preferably the diameter is less than 35 mm 30 mm or less than 25 mm. Preferably the diameter is 28 mm. The pin of the first tag part is preferably longer than 15 mm, 20 mm or longer than 25 mm. Preferably, the pin is shorter than 28 mm, 25 mm or shorter than 21 mm. Preferably, the pin is 21 mm or 25 mm long. Preferably, the tag body of the first and second tag parts together weigh more than 3 g and less than 4 g. Preferably they weigh 3.4 g.

In an advantageous embodiment, the tag body of the first and/or second tag part has a maximum height and/or a maximum width of more than 20 mm, 25 mm or more than 30 mm and preferably the maximum height and/or the maximum width is less than 35 mm, 30 mm or less than 25 mm. Preferably, the maximum height and/or the maximum width is 28 mm. The pin of the first tag part is preferably longer than 15 mm, 20 mm or longer than 25 mm. Preferably, the pin is shorter than 28 mm, 25 mm or shorter than 21 mm. Preferably, the pin is 21 mm long. Preferably, the tag body of the first tag part and the tag body of the second tag part together weigh more than 3 g and less than 4 g. Preferably they weigh 3.5 g.

In an advantageous embodiment, the tag body of the first and/or second tag part has a maximum height of more than 80 mm, 90 mm, 100 mm, 110 mm or more than 120 mm and preferably the maximum height is less than 125 mm, 115 mm, 105 mm or less than 95 mm. Preferably, the maximum height is 102 mm. Additionally or alternatively, the tag body of the first and/or second tag part has a maximum width of more than 50 mm, 60 mm, 70 mm, 80 mm or more than 90 mm and preferably the maximum width is less than 95 mm, 85 mm, 75 mm or less than 65 mm. Preferably, the maximum width is 76 mm. The pin of the first tag part is preferably longer than 15 mm, 20 mm or longer than 25 mm.

Preferably, the pin is shorter than 28 mm, 25 mm or shorter than 21 mm. Preferably, the pin is 21 mm long. Preferably, the tag body of the first and second tag part together weigh more than 15 g and less than 25 g. Preferably they weigh 19.9 g.

In an advantageous embodiment, the tag bodies of the first and/or second tag part have a wall thickness of 1 mm to 1.4 mm. This applies to the printed areas that are free of the pin or the receiving element.

In an advantageous embodiment, the dimensions of the tag bodies of the first and second tag parts are identical or differ from each other by less than 5%.

In an advantageous embodiment, the antimicrobial additive is evenly distributed in the plastic. This means that the amount of antimicrobial additive inside the plastic neither decreases nor increases compared to the amount of antimicrobial additive on the surface of the plastic.

In an advantageous embodiment, the concentration of the antimicrobial additive is 2% or less than 2% of the total weight of the plastic. This means, for example, that 2 g or less than 2 g of the antimicrobial additive is added to 100 g of plastic.

In an advantageous embodiment, the concentration of the antimicrobial additive is in the range of 0.2% to 0.6% of the total weight of the plastic. This means, for example, that between 0.2 g and 0.6 g of the antimicrobial additive are added to 100 g of plastic.

In an advantageous embodiment, the antimicrobial additive comprises a silver component. The antimicrobial additive is therefore preferably silver-based, and the antimicrobial effect is preferably provided by silver ions ($Ag^+$). The antimicrobial additive therefore works preferentially due to the silver ions. The silver component can be, for example, elemental silver or organic or inorganic silver salts (e.g. silver oxide, silver phosphate, silver chloride, silver sulphate, silver calcium sodium phosphate, silver zirconium compounds) or mixtures thereof. Preferably, the silver component comprises and more preferably, the silver component consists of one or more inorganic silver salts. In a preferred embodiment, the silver component comprises and preferably consists of silver oxide.

The presence of silver ions from the additive leads to effective suppression of a plurality of bacteria, viruses and fungi, which significantly reduces the risk of infection at the puncture site after the ear tag is applied. Another advantage of silver ions as an antimicrobial agent is their long-term effect. Silver ions are present continuously and over a long period of time, providing long-lasting protection against the colonization and multiplication of pathogens. This long-lasting effect is particularly valuable in livestock farming, where a long-term solution is required to minimize the risk of infection. In addition, silver ions are effective against a broad spectrum of microorganisms without causing resistance to the same extent as conventional antibiotics. This property makes silver ions a sustainable option in the fight against infections, especially in times of increasing antibiotic resistance. Silver-based additives are also able to enhance the effectiveness of other antimicrobial and hygiene measures by forming an additional protective layer that prevents the transmission of infections. This combination of effectiveness, long-term efficacy and broad-spectrum activity makes the use of antimicrobial additives containing a silver component a valuable strategy for reducing the risk of infection in animal farming. At the same time, sufficiently high temperature resistance is ensured so that the antimicrobial additive can be added to the plastic in a plastic injection moulding process.

In an advantageous embodiment, the antimicrobial additive contains a silver component in a glass-ceramic carrier. An important advantage of this technology is the controlled presence of silver ions, which is made possible by the glass-ceramic carrier. Glass-ceramic is a material characterized by its porous structure, which encloses the embedded silver component and regulates the presence of silver ions evenly over a long period of time. This ensures a sustained antimicrobial effect without the need for a high initial concentration, minimizing the risk of skin irritation or toxic effects. Another advantage of this technology is the high stability of the system. Glass-ceramic carriers protect the silver component from premature reaction or degradation, which increases its effectiveness and longevity. This means that the antimicrobial efficiency is maintained over the entire lifetime of the product, such as an animal ear tag. In addition, the use of glass-ceramic allows precise control over the size and distribution of the pores, which further optimizes the exposure of the silver ions. This helps to achieve optimal antimicrobial activity that is specific to the risk of infection without harming the environment or the livestock.

In an advantageous embodiment, the antimicrobial additive is formed on the basis of wet-milled inorganic carrier particles containing a silver component, wherein the inorganic carrier particles have a smooth surface and are produced by wet milling. Wet milling is a process in which solid materials are crushed in a liquid to produce particles of extremely fine size. This method has a number of positive effects on the properties of the glass-ceramic substrate. Firstly, wet grinding enables precise control over the particle size and particle distribution of the glass-ceramic material. This is crucial as a uniform and fine particle size increases the surface area, resulting in a more efficient exposure of the embedded silver ions. An increased surface area facilitates a more uniform interaction between the silver ions and the microorganisms, increasing the antimicrobial efficacy of the additive. In addition, wet grinding improves the homogeneity of the material. The fine and even distribution of the particles within the glass-ceramic matrix ensures that the silver ions are evenly distributed. This results in consistent antimicrobial activity throughout the material, which is beneficial for applications where reliable and long-lasting antimicrobial activity is required. The fine particles produced by wet grinding also facilitate better bonding and integration of the glass ceramic in the end product. In this way, a more homogeneous distribution of the antimicrobial additive in the plastic can be achieved. This also improves the mechanical stability and durability of the antimicrobial additive, which is particularly important in areas such as animal farming where materials are exposed to harsh conditions.

In an advantageous embodiment, the inorganic carrier particles comprise glass particles with an average particle size of 0.01 μm to 100 μm and a silver component content of 0.01 to 5 wt. % or up to 10 wt. %. The use of different sizes for the carrier particles allows smaller particles (near the lower end of the spectrum) to have a higher surface area relative to their volume, which improves the exposure of silver ions and thus antimicrobial activity. These fine particles can act quickly and effectively against microorganisms. Larger particles (in the upper range of the spectrum) offer a longer presence of the silver ions, resulting in a sustained antimicrobial effect over a longer period of time. This combination of fast and long-lasting action is ideal to cover a wide range of applications. The specified range of silver component content from 0.01 to 5 wt % or up to 10 wt % provides a flexibility in dosage that allows the balance between antimicrobial efficacy and material cost to be effectively controlled. A lower concentration of silver component may be sufficient for applications where moderate antimicrobial activity is required, while a higher concentration of silver component may be beneficial for more demanding applications where strong antimicrobial activity is required. This flexibility in concentration enables cost-efficient adaptation to specific requirements without compromising safety or efficacy. For example, the silver component concentration can be varied for animal ear tags used for different livestock. In addition, careful selection of particle size and silver component concentration minimizes potential risks to humans and the environment by ensuring that the presence of silver ions is limited to a level necessary to achieve an effective antimicrobial effect without overdosing or unnecessary exposure.

In an advantageous embodiment, exactly two or at least two different sizes of inorganic carrier particles can be used in the plastic. As such, smaller particles (near the lower end of the spectrum) and larger particles (in the upper range of the spectrum) can be used simultaneously in the same animal ear tag.

In an advantageous embodiment, the inorganic carrier particles are boron-containing and/or phosphate-containing glass particles which contain a silver salt as a silver component. In a further advantageous embodiment, the inorganic carrier particles are boron-containing and/or phosphate-containing glass particles which contain silver oxide as the silver component. The specific material combination of boron-containing and/or phosphate-containing glass particles as inorganic carrier particles and silver salt or silver oxide as silver component improves the efficacy and stability of the antimicrobial agents. The inclusion of boron-containing or phosphate-containing glass particles in carrier particles provides an excellent basis for the controlled exposure of silver ions. The bioactive nature of these glass particles can enhance the interaction with microorganisms and thus increase the antimicrobial efficiency of the silver ions. The combination with silver oxide or silver salts as an antimicrobial component utilizes the strong disinfecting properties of silver. Silver oxide and silver salts are effective in killing or inhibiting a wide range of microorganisms, including bacteria, fungi and some viruses. In addition, the possible processing temperature increases when boron and/or phosphate containing glass particles are used.

In an advantageous embodiment, the antimicrobial additive is in powder form.

In an advantageous embodiment, the antimicrobial additive is a crystalline powder. A crystalline powder is characterized by its uniform particle size and particle shape, which enables uniform distribution and incorporation into the plastic. This homogeneity ensures that the antimicrobial effect is constant across the entire material. Another advantage lies in the specific surface structure and porosity that crystalline powders can provide. These properties improve the antimicrobial efficacy of the antimicrobial additive by providing a larger surface area for interaction with microorganisms. This ensures rapid and effective antimicrobial activity, which helps to prevent the growth and spread of bacteria, fungi and other harmful microorganisms. The crystalline structure also allows for precise dosing and easy adjustment of the concentration of the antimicrobial additive to meet specific requirements of different applications. This is crucial for the development of customized solutions that are both effective and economical. Finally, the powder form offers advantages in terms of compatibility with different production processes. In powder form, the antimicrobial additive can be easily added to the plastic.

In an advantageous embodiment, 98% of the particles of the antimicrobial additive are smaller than 5 μm and 50% of the particles of the antimicrobial additive are smaller than 2 μm. The small particle size enables a significantly larger surface area in relation to the volume of the particles. This increased surface area improves the interaction between the antimicrobial additive and the microorganisms, resulting in a more efficient and faster antimicrobial effect. Small particles can react faster and to a greater extent with bacteria, viruses or fungi, increasing the likelihood that the microorganisms will be effectively killed or inhibited in their growth. In addition, the fineness of the particles improves their dispersibility in different media or carrier materials. The fine particles can be distributed more evenly in the plastic, resulting in a consistent antimicrobial protective layer over the entire volume. The small particle size also facilitates the processing of the antimicrobial additive. Fine powders tend to mix better with other materials and can be more easily integrated into production processes, such as plastic injection moulding, without negatively affecting the physical properties of the end product.

In an advantageous embodiment, the refractive index of the antimicrobial additive is 1.507 with a deviation of ±10%. The refractive index is approximately at the value of thermoplastic polyurethane, which is approximately 1.51 to 1.54. The refractive index of the additive is therefore close to the refractive index of the plastic, which minimizes the scattering or distortion of light that can occur when materials with different optical densities are combined. This would be advantageous for transparent animal ear tags, for example.

In an advantageous embodiment, the plastic is a thermoplastic polyurethane (TPU). A thermoplastic polyurethane has exceptional durability and abrasion resistance, which makes it ideal for products that are exposed to heavy use, such as animal ear tags. Thermoplastic polyurethane is also waterproof and resistant to microorganisms, which makes it suitable for outdoor applications, especially for livestock. Another significant advantage is the environmental compatibility of thermoplastic polyurethane. It is generally recyclable and can be processed without the use of plasticizers.

In an advantageous embodiment, the plastic is a thermoplastic polyurethane with a biological content of 32% with a deviation of 3%. Such a bio-based content in thermoplastic polyurethane underlines the commitment to environmentally friendly production processes and products by utilizing renewable resources instead of relying solely on fossil fuels. This helps to reduce the carbon emissions associated with the production of plastics and promotes sustainability in material production. It is also possible that the biological content could be over 40%, 50%, 60%, 70% or over 80%.

In an advantageous embodiment, the animal ear tag is composed of more than 95% of the plastic In an advantageous embodiment, the antimicrobial additive is odorless.

In an advantageous embodiment, the plastic comprises iodine in addition to the antimicrobial additive. This achieves a wound-healing and disinfecting effect.

In an advantageous embodiment, the bulk density of the antimicrobial additive is 1050 kg/m$^3$ to 1100 kg/m$^3$.

In an advantageous embodiment, the hardness of the thermoplastic polyurethane is: A1: 95 (Shore A/D), according to ISO 868.

In an advantageous embodiment, the specific density of the thermoplastic polyurethane is: 1.17 g/cm$^3$, according to ISO 2781.

In an advantageous embodiment, the tensile strength of the thermoplastic polyurethane is: 36 MPa, according to ISO 527-2/5A/200.

In an advantageous embodiment, the ultimate elongation of the thermoplastic polyurethane is: 415%, according to ISO 527-2/5A/200.

In an advantageous embodiment, the abrasion resistance of the thermoplastic polyurethane is: 28 $mm^3$, according to ISO 4649-A.

The animal ear tag can be produced particularly well if the plastic used is ESTANE® ECO 12T95 from The Lubrizol Corporation and the antimicrobial additive used is Sanitized® BC A 21-41 from Sanitized AG. Both materials are fed together to a plastic injection moulding machine. EP 2 016 825 A1 describes the production of an antimicrobial additive with a silver component. The content of this patent application, in particular the preparation of the antimicrobial additive and its composition, is made the subject-matter of this application by reference.

The method for producing the animal ear tag comprises several process steps. In a first process step, a granulate of thermoplastic polyurethane having a biological content of 32% with a deviation of ±3% and an antimicrobial additive in the form of a crystalline powder is added to a mixer, wherein the antimicrobial additive is 0.2% to 2% of the total weight of the thermoplastic polyurethane, wherein the antimicrobial additive is dosed in particular by means of a weight-based dosing device, a dosing funnel, a gravimetric dosing hopper, a side extruder or a tumbler. In a second process step, the granulate of thermoplastic polyurethane and the antimicrobial additive are mixed together. In a third process step, the mixture is fed to a plastic injection moulding machine. In a fourth process step, the animal ear tag is produced by the plastic injection moulding machine. In the event that the animal ear tag comprises a first and a second tag part, both tag parts can be produced simultaneously by means of a common injection mould or in different injection moulds.

The use of an antimicrobial additive comprises a silver component is for the production of an animal ear tag.

The use of an animal ear tag comprises an antimicrobial additive, wherein the antimicrobial additive contains a silver component, is for marking livestock, in particular for cattle, pigs, goats and sheep.

BRIEF DESCRIPTION OF THE DRAWINGS

In the following, example embodiments are described purely by way of example with reference to the drawings. It shows:

FIG. 5:
an illustration of an example tag attached to an ear of an animal.

DETAILED DESCRIPTION OF EXAMPLE EMBODIMENTS

The structure of the animal ear tag 1 is explained in more detail in the following figures. As shown in FIG. 5, the animal ear tag 1 is used to mark livestock. The animal ear tag 1 comprises a first tag part 2 and a second tag part 3. The first tag part 2 and the second tag part 3 can be attached to each other and to an ear 4 (see FIGS. 3A, 3B, 5) of a livestock.

Figure 1B:
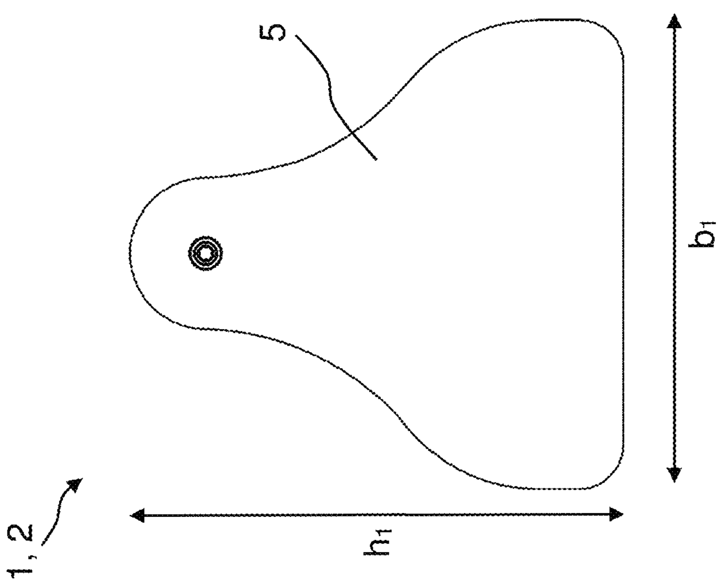
FIGS. 1A, 1B:
different views of a first tag part of the animal ear tag with a tag body and a pin.
Figure 1A:
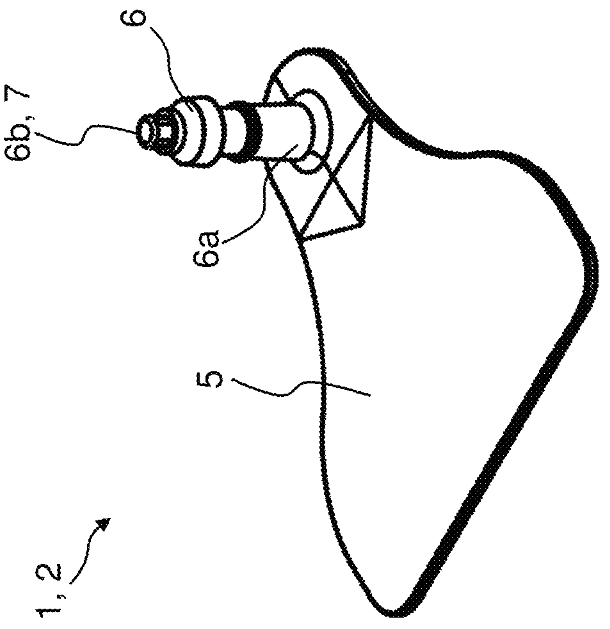

FIGS. 1A and 1B show the first tag part 2 of the animal ear tag 1. The first tag part 2 comprises a tag body 5 and a pin 6, which is arranged with its first end 6*a* on the tag body 5 and which comprises a tip 7 and/or cutting edge at its second end 6*b*. The pin 6 is arranged at one end region of the tag body 5, wherein the tag body 5 widens starting from this first end region. FIG. 1B shows the rear side of the tag body 5 from FIG. 1A.

The tag body 5 of the first tag part 2 has a maximum height $h_1$ which is preferably greater than 4.5 cm, 5 cm, 5.5 cm or greater than 6 cm and which is preferably less than 6.5 cm or less than 6 cm. Preferably, the maximum height $h_1$ is 5.9 cm. The tag body 5 of the first tag part 2 has a maximum width $b_1$ which is preferably greater than 4.5 cm, 5 cm, 5.5 cm or greater than 6 cm and which is preferably less than 6.5 cm or less than 6 cm. Preferably, the maximum width $b_1$ is 5.6 cm.

The pin 6 of the first tag part 2 has a length $l_1$ which is greater than 1.2 cm, 1.5 cm, 2 cm or which is greater than 2.5 cm and which is preferably less than 2.3 cm. Preferably, the length $l_1$ is 2.29 cm.

The tag body 5 and/or the pin 6 of the first tag part 2 comprise a plastic in which an antimicrobial additive is incorporated. Preferably, the plastic of the tag body 5 and the pin 6 is the same. However, different plastics can also be provided. In principle, it is also possible that the tip 7 and/or cutting edge of the pin 6 is made of or comprises a different material, for example a metal, compared to the rest of the pin 6 or the tag body 5.

The tag body 5 of the first tag part 2 has a thickness of approximately 1 mm.

Figure 2B:
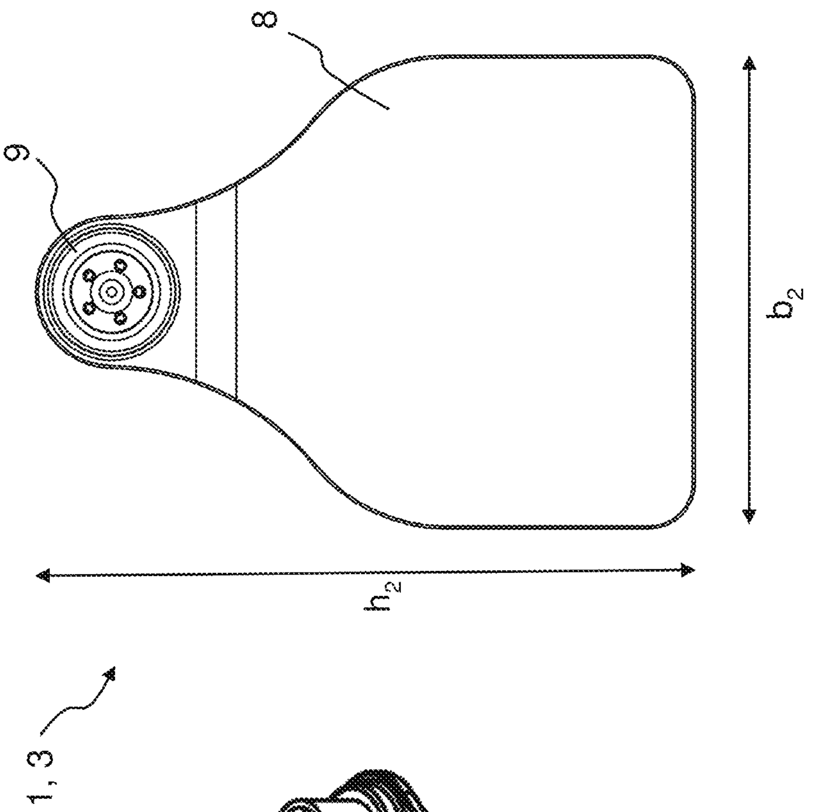
FIGS. 2A, 2B, 2C:
different views of a second tag part of the animal ear tag with a tag body and a receiving element.
Figure 2A:
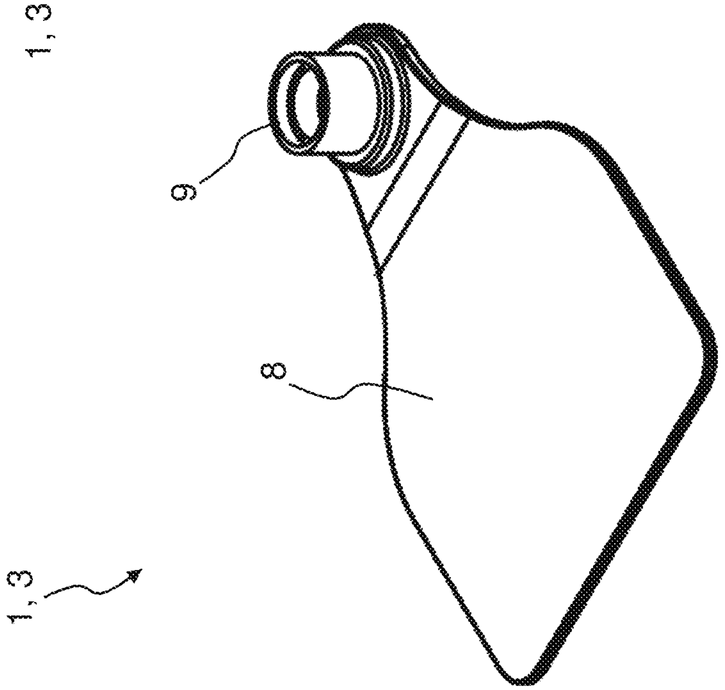
Figure 2C:
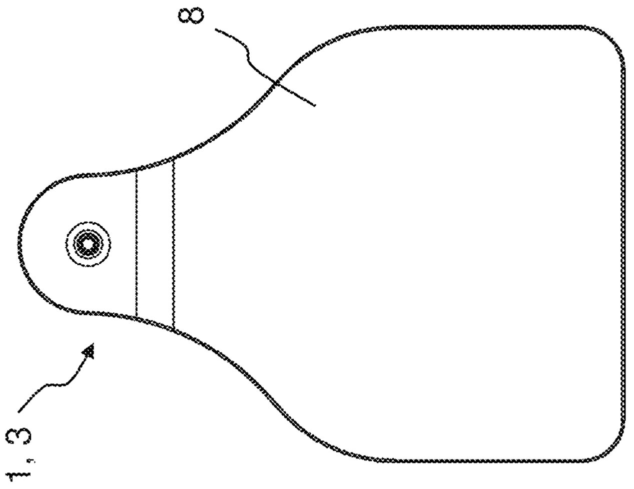

FIGS. 2A, 2B and 2C show the second tag part 3 of the animal ear tag 1. The second tag part 3 comprises a tag body 8 and a receiving element 9, which is arranged on the tag body 8. The receiving element 9 is configured to receive the pin 6 of the first tag part 2.

The tag body 8 of the second tag part 3 has a maximum height $h_2$ which is preferably greater than 6 cm, 6.5 cm, 7 cm, 7.5 cm or greater than 8 cm and which is preferably less than 8.5 cm or less than 8 cm. Preferably, the maximum height $h_2$ is 7.8 cm. The tag body 8 of the second tag part 3 has a maximum width $b_2$, which is preferably greater than 4.5 cm, 5 cm, 5.5 cm or greater than 6 cm and which is preferably less than 6.5 cm or less than 6 cm. Preferably, the maximum width $b_2$ is 5.6 cm.

The receiving element 9 of the second tag part 3 has a length $l_2$ which is greater than 0.5 cm, 0.8 cm, 1 cm or greater than 1.5 cm and which is preferably less than 2 cm or less than 1.5 cm. Preferably, the length $l_2$ is 1.12 cm.

The tag body 8 and/or the receiving element 9 of the second tag part 3 comprise a plastic into which an antimicrobial additive is incorporated. Preferably, the plastic of the tag body 8 and the receiving element 9 is the same. However, different plastics can also be used.

The tag body 8 of the second tag part 3 has a thickness of approx. 1 mm.

FIG. 2C shows a rear side of FIGS. 2A and 2B.

Figure 3A:
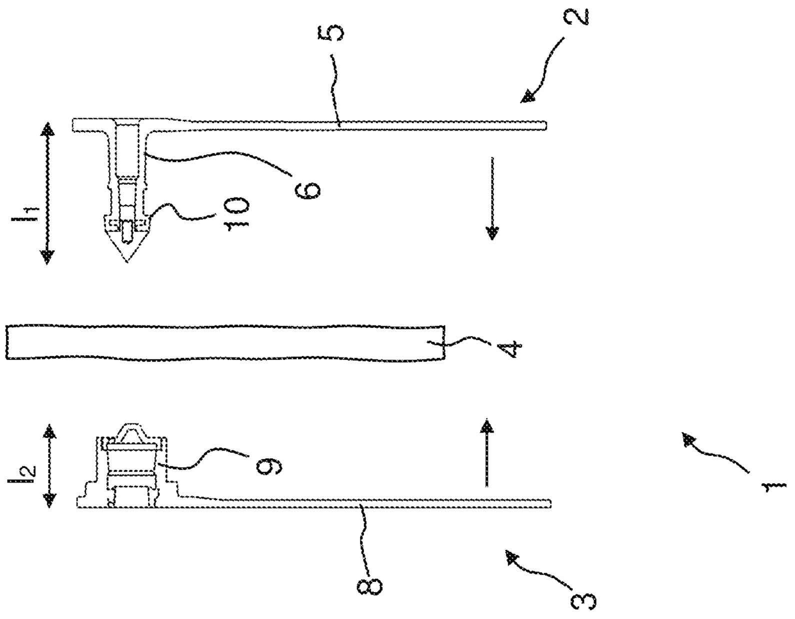
FIGS. 3A, 3B:
different views showing a connection of the first and second tag parts to each other and to an ear of a livestock.
Figure 3B:
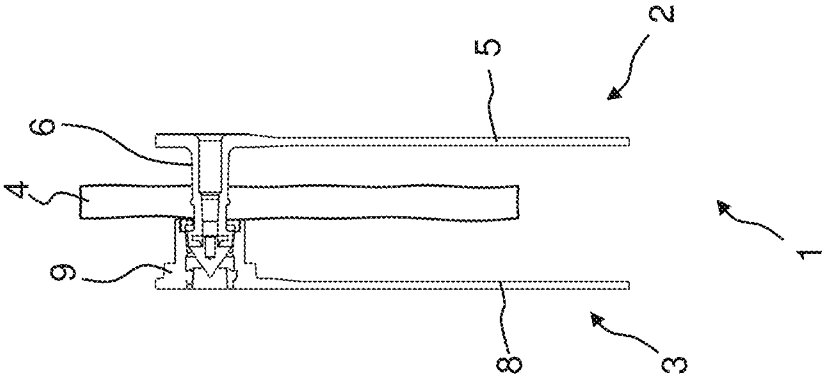

FIGS. 3A and 3B show different views illustrating a connection of the first and second tag parts 2, 3 to each other and to the ear 4 of the livestock. Both tag parts 2, 3 are preferably pressed together with a pair of pliers, whereby the ear 4 of the livestock is arranged between both tag parts 2, 3. Both tag parts 2, 3 move towards each other, as shown by the arrows in FIG. 3A.

The pin 6 of the first tag part 2 comprises at least one or at least two barbs 10, which engage in a corresponding counterpart in the receiving element 9 of the second tag part 3 and prevent the first tag part 2 from being pulled off the second tag part 3.

The pin 6 of the first tag part 2 can be partially hollow.

At least part of the pin 6 and the tag body 5 of the first tag part 2 are configured in one piece and preferably comprise the same plastic.

The plastic and the antibacterial additive can be composed according to the explanations in the introduction to the description.

Figure 4:
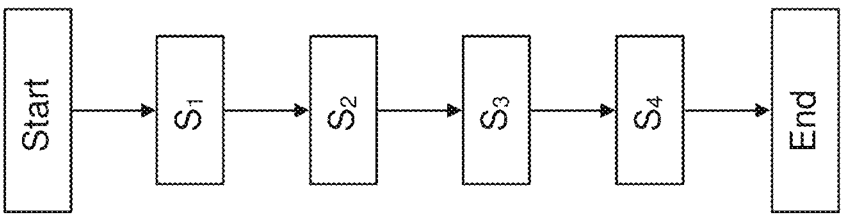
FIG. 4: a flowchart showing a method for producing the animal ear tag.

FIG. 4 shows a flowchart explaining a method for producing the animal ear tag 1. In a first process step $S_1$, a granulate of thermoplastic polyurethane with a biological content of 32% with a deviation of ±3% and an antimicrobial additive in the form of a crystalline powder is added to a mixer, wherein the antimicrobial additive is 0.2% to 2% of the total weight of the thermoplastic polyurethane, wherein the antimicrobial additive is dosed in particular by means of a gravimetric dosing hopper, side extruder or tumbler. In a second process step $S_2$, the granulate of thermoplastic polyurethane and the antimicrobial additive are mixed together. In a third process step $S_3$, the mixture is fed to a plastic injection moulding machine. In a fourth process step $S_4$, the animal ear tag 1 is produced by the plastic injection moulding machine. In the event that the animal ear tag 1 comprises a first and a second tag part 2, 3, both tag parts 2, 3 can be produced by means of a common injection mould at the same time or in different injection moulds.

The invention is not limited to the embodiments described. Within the scope of the invention, all described and/or drawn features can be combined with each other as desired.

LIST OF REFERENCE SIGNS

Animal ear tag 1
First tag part 2
Second tag part 3
Ear (of a livestock) 4
Tag body (of the first tag part) 5
Pin (of the first tag part) 6
First end (of the pin) 6*a*
Second end (of the pin) 6*b*
Tip (of the pin) 7
Tag body (of the second tag part) 8
Receiving element (of the second tag part) 9
Barb 10
Height of tag body (first tag part) $h_1$
Width of tag body (first tag part) $b_1$
Length of pin $l_1$
Height of tag body (second tag part) $h_2$
Width of tag body (second tag part) $b_2$
Length of receiving element $l_2$
Process steps $S_1$, $S_2$, $S_3$, $S_4$

The invention claimed is:

1. Animal ear tag for marking livestock comprising:

the animal ear tag comprises a plastic; and an antimicrobial additive is incorporated into the plastic, wherein:

a) the antimicrobial additive is formed on a basis of wet-milled inorganic carrier particles containing a silver component, wherein the inorganic carrier particles have a smooth surface and are produced by wet milling; and/or b) the antimicrobial additive is a crystalline powder; and/or c) 98% of particles of the antimicrobial additive are smaller than 5 μm and 50% of the particles of the antimicrobial additive are smaller than 2 μm; and/or d) a refractive index of the antimicrobial additive is 1.507 with a deviation of ±10%;

and/or e) the plastic is a thermoplastic polyurethane and a biological content in the thermoplastic polyurethane is 32% with a deviation of ±3%.

2. The animal ear tag according to claim 1 wherein:

the animal ear tag comprises a first tag part and a second tag part which are configured to be attached to each other and to an ear of the livestock;

the first tag part comprises the plastic into which the antimicrobial additive is incorporated and/or the second tag part comprises the plastic into which the antimicrobial additive is incorporated.

3. The animal ear tag according to claim 2, wherein:

the first tag part is composed of more than 95% of the plastic into which the antimicrobial additive is incorporated; and/or the second tag part is composed of more than 95% of the plastic into which the antimicrobial additive is incorporated.

4. The animal ear tag according to claim 2, wherein:

the first tag part comprises a first tag body and a pin, wherein the pin of the first tag part is arranged with its first end on the first tag body of the first tag part and wherein the pin of the first tag part comprises a tip and/or cutting edge at its second end;

the second tag part comprises a second tag body and a receiving element which is arranged on the second tag body of the second tag part;

the pin of the first tag part is configured to be pressed through an ear of the livestock and into the receiving element of the second tag part.

5. The animal ear tag according to claim 4, wherein:

the first tag body and/or the pin of the first tag part comprise the plastic into which the antimicrobial additive is incorporated; and/or the second tag body and/or the receiving element of the second tag part comprise the plastic into which the antimicrobial additive is incorporated.

6. The animal ear tag according to claim 4, wherein the pin and/or the receiving element is deformed after connection has been made.

7. The animal ear tag according to claim 4, wherein the pin is arranged at a first end region of the first tag body of the first tag part, wherein the first tag body of the first tag part widens starting from this first end region;

or the receiving element is arranged at a second end region of the second tag body of the second tag part, wherein the second tag body of the second tag part widens starting from this second end region.

8. The animal ear tag according to claim 4, wherein the first tag part has a first shape that is the same as a second shape of the second tag part.

9. The animal ear tag according to claim 4, wherein:

a surface area of the first tag part is smaller than a surface area of the second tag part; or the surface area of the first tag part is larger than the surface area of the second tag part.

10. The animal ear tag according to claim 4, wherein the first tag body of the first tag part is printed and/or the second tag body of the second tag part is laser-printed.

11. The animal ear tag according to claim 4, wherein the first tag body of the first tag part and/or the second tag body of the second tag part comprises a printed area(s) which is/are free of the pin or the receiving element have a wall thickness of 1 mm to 1.4 mm.

12. The animal ear tag according to claim 1, wherein:

the antimicrobial additive is evenly distributed in the plastic.

13. The animal ear tag according to claim 1, wherein:

the concentration of the antimicrobial additive is 2% or less of the total weight of the plastic.

14. The animal ear tag according to claim 1, wherein:

the concentration of the antimicrobial additive is in the range of 0.2% to 0.6% of the total weight of the plastic.

15. The animal ear tag according to claim 1, wherein:

the antimicrobial additive comprises a silver component.

16. The animal ear tag according to claim 1, wherein:

the inorganic carrier particles comprise glass particles with an average particle size of 0.01 μm to 100 μm and a silver component content of 0.01 to 5 wt. % or up to 10 wt. %.

17. The animal ear tag according to claim 16, wherein:

the inorganic carrier particles are boron-containing and/or phosphate-containing glass particles that contain a silver salt as a silver component.

18. The animal ear tag according to claim 16, wherein:

the inorganic carrier particles are boron-containing and/or phosphate-containing glass particles that contain silver oxide as a silver component.

19. The animal ear tag according to claim 1, wherein:

the plastic is a thermoplastic polyurethane.

20. The animal ear tag of claim 1 wherein the livestock comprises cattle, pigs, goats and/or sheep.

21. Animal ear tag for marking livestock comprising:

the animal ear tag comprises a plastic; and an antimicrobial additive is incorporated into the plastic, wherein:

the antimicrobial additive comprises a silver component in a glass-ceramic carrier.

* * * * *